No. 699,011. Patented Apr. 29, 1902.
W. R. QUINAN.
APPARATUS FOR THE MANUFACTURE OF CONCENTRATED SULFURIC ACID.
(Application filed July 3, 1899.)
(No Model.) 3 Sheets—Sheet 1.
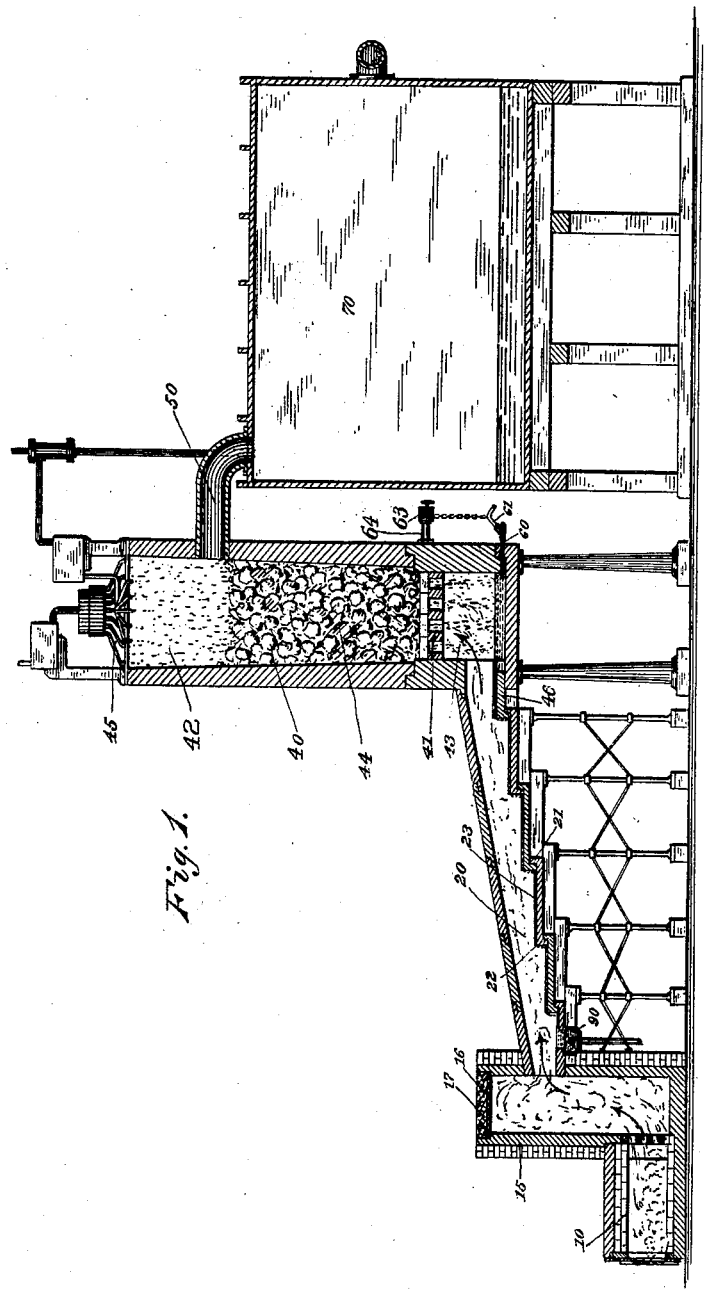
WITNESSES
INVENTOR
Attorney No. 699,011. Patented Apr. 29, 1902.
W. R. QUINAN.
APPARATUS FOR THE MANUFACTURE OF CONCENTRATED SULFURIC ACID.
(Application filed July 3, 1899.)
(No Model.) 3 Sheets—Sheet 2.
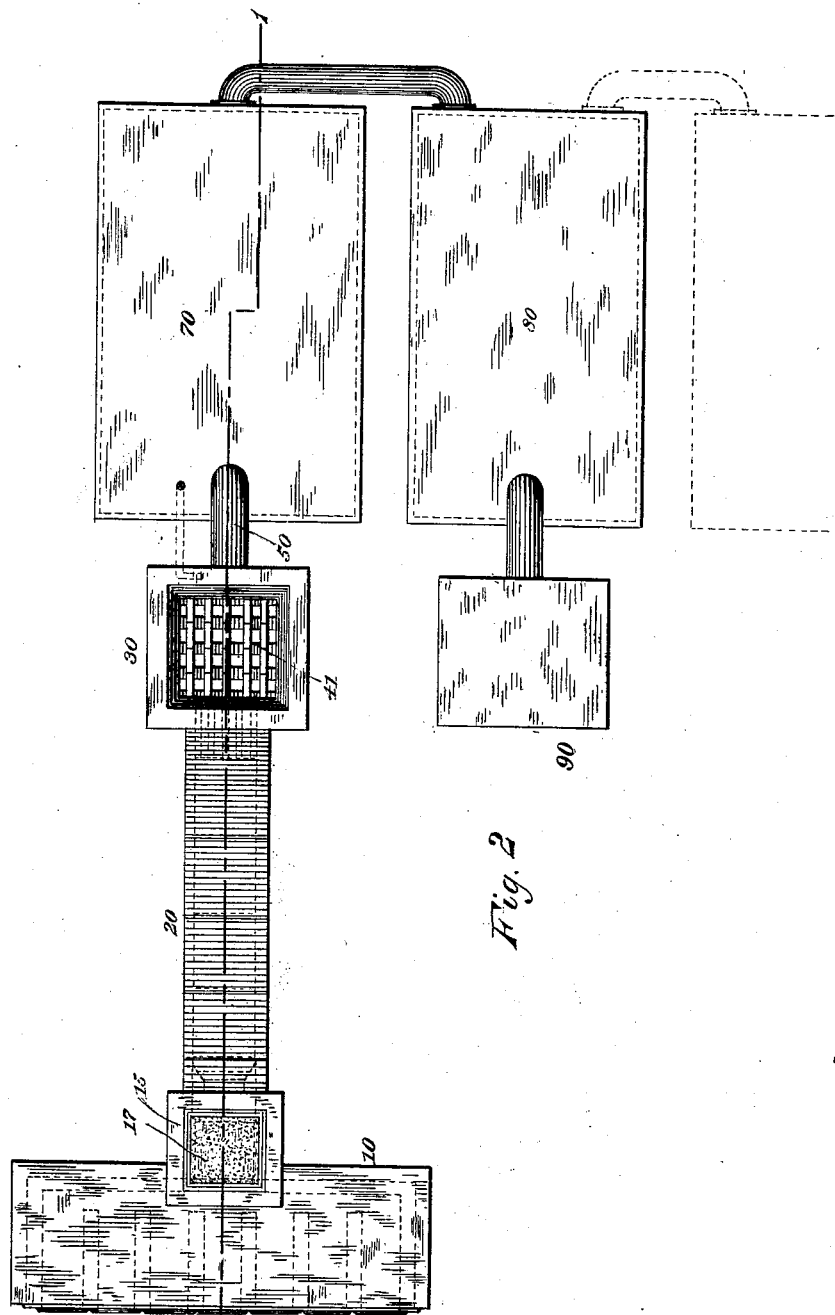
WITNESSES
INVENTOR
Attorney No. 699,011. Patented Apr. 29, 1902.
W. R. QUINAN.
APPARATUS FOR THE MANUFACTURE OF CONCENTRATED SULFURIC ACID.
(Application filed July 3, 1899.)
(No Model.) 3 Sheets—Sheet 3.
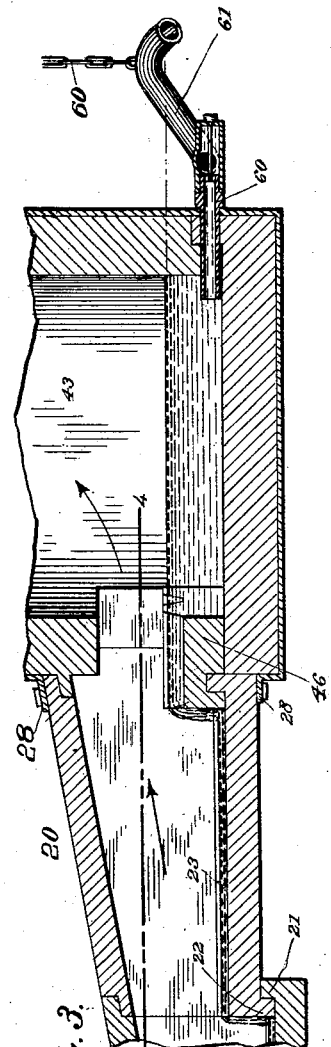
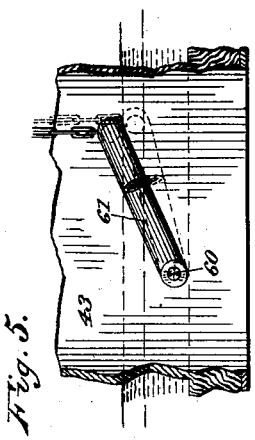
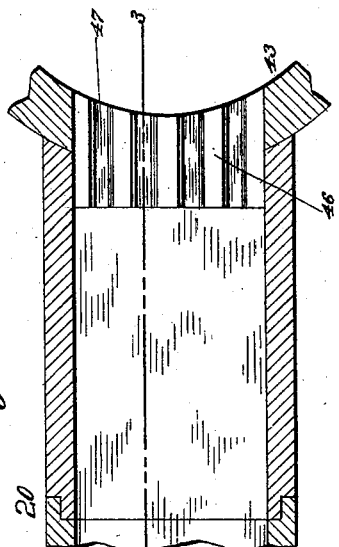
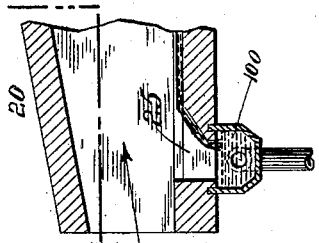
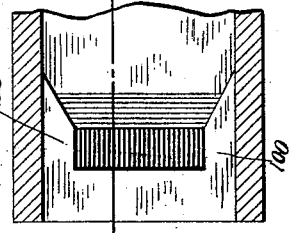
WITNESSES
INVENTOR
Attorney

UNITED STATES PATENT OFFICE.

WILLIAM RUSSELL QUINAN, OF PINOLE, CALIFORNIA.

APPARATUS FOR THE MANUFACTURE OF CONCENTRATED SULFURIC ACID.

SPECIFICATION forming part of Letters Patent No. 699,011, dated April 29, 1902.

Application filed July 3, 1899. Serial No. 722,639. (No model.)

*To all whom it may concern:*

Be it known that I, WILLIAM RUSSELL QUINAN, a citizen of the United States of America, formerly residing at Pinole, in the county of Contra Costa, in the State of California, now on the way to and about to take up my residence at Wellington, South Africa, have invented certain new and useful Improvements in Apparatus for the Manufacture of Concentrated Sulfuric Acid, of which the following is a specification.

This invention relates to an apparatus for the production of sulfuric acid by what is known as the "combustion" process, which consists in the burning of sulfur either in the form of brimstone or of a pyrites sulfid to produce sulfurous acid, otherwise known as "sulfur dioxid," and then mixing the sulfur dioxid with air, water-vapor, and nitrous vitriol, and permitting chemical reactions to take place, whereby oxygen of the air and water are combined with the sulfur dioxid and sulfuric acid formed.

In the manufacture of concentrated sulfuric acid by the combustion process it is usual to first produce a weak acid in one apparatus and then to concentrate the acid so made in another apparatus by exposing it to the evaporating action of heat obtained from extraneous fuel. The apparatus used for making the weak acid usually comprises a burner-kiln in which sulfur or pyrites is burned to produce the sulfurous-acid gas, which is utilized in the subsequent steps for the production of sulfuric acid, a Glover tower in connection with the burner-kiln, a series of lead-lined chambers, the first of which is connected with the Glover tower, and a Gay-Lussac tower connected with the last of said lead-lined chambers. The acid produced in the lead chambers is usually of a strength of about 55° to 60° Baumé. This acid is pumped from the chambers to the Glover tower and there concentrated to a strength of 62° to 63° Baumé. The acid so formed is then put through the concentrating apparatus heated by extraneous fuel to form the concentrated sulfuric acid known in the trade as a "sixty-six degree" acid, which is an acid containing from ninety-three to ninety-eight per cent. of $H_2SO_4$.

The object of this invention is to provide an apparatus for producing the commercial sulfuric acid, otherwise known as "sixty-six degree" acid, in a continuous operation by the heat of the burning sulfur or pyrites and the chemical reactions without the use of extraneous fuel.

This invention is preferably embodied in an apparatus of which a Glover tower forms a part; but it may be useful in apparatus from which such tower is omitted. As usually arranged in acid apparatus, the flue which conveys the burner-gases to the Glover tower enters said tower a little above the bottom thereof and the hot gases pass up through a grating or grill into the tower filling or packing, which consists of broken quartz or other acid-resisting material, where it meets liquid acid trickling down. This acid is mostly made in the lead chambers of the apparatus and carries an excess of water and a certain proportion of nitrous oxids. It is fed into the top of the tower as a mixture of chamber and a special acid called the "nitrous vitriol," carrying the nitrous element.

In a sulfuric-acid apparatus the Glover tower has a fourfold function. It denitrates the vitriol made in the lead chambers, it concentrates to a higher degree the acid so made, it supplies to the lead chambers steam and nitrous acid, which are necessary to the chemical operation which goes on therein, the steam coming from the surplus water evaporated from the acid and the nitrous oxid being driven off in denitration. The tower is also an acid-making device, the elements required to make sulfuric acid reacting upon each other in the tower to a certain extent, and this is a very useful function, because additional heat is thereby generated and the other effects are intensified. The concentrating action of such a Glover tower has generally been limited to the production of an acid of 61° or, at most, of 63° Baumé. One reason for this is that where one tower is used both for "denitrating" and "concentrating" a stronger acid will not be denitrated. The nitrous element forms with concentrated acid a very stable combination, which defies even the specific decomposing effect of the sulfur dioxid.

The office of the Glover tower is in every way a rational one, since it utilizes the sulfurgas ($SO_2$) to decompose the nitrous vitriol—that is, to denitrate the acid and utilize the heat of the burning sulfur to concentrate it and to partly supply thereby the chambers with steam; but from the nature and service of the tower this latter office of concentrating is limited. In the usual arrangement the concentration cannot be carried to the highest point—viz., to produce an acid of 66° Baumé, (a trade designation for concentrated acid varying from ninety-three to ninety-eight per cent. of $H_2SO_4$.) In order to do this, an amount of water which represents the difference between chamber-acid and 66° acid must be evaporated in the tower and, moreover, make its escape as vapor from the top. The construction and making of the tower precludes the possibility of this. The acid must be fed into the top of the tower at a moderate temperature, since the "vitriol" is unstable when heated. The temperature of the upper portion of the tower is controlled by these acids. As liquids they have a direct cooling effect, and this is greatly enhanced by the volatilization of the water and nitrous oxids. Now Lunge and others have clearly shown the extraordinary condensing effect of numerous obstructing surfaces, such as the quartz filling of the tower, especially when there is a cooling effect upon the gases. The water driven off in the middle or lower part of the tower is largely recondensed as weak acid in the upper part, where the temperature is low, and drips back into the bottom acid. It is this direct reflux action of the tower which gives a natural limit to its concentrating effect. In fact, it has been found that increasing the height beyond a certain narrow limit diminishes instead of increasing the strength of the acid delivered from the tower.

My invention is intended to thoroughly utilize the concentrating effect of the hot gases upon the acid after it leaves the Glover tower. I employ a device in which there is also a reflux action, but it differs from that of the tower in being selective. This device consists of a supplement to the tower in the form of a concentrating-flue, which also serves at the same time the ordinary purpose of a flue to conduct the burner-gases to the tower. One of its advantages is that its concentrating function may be eliminated without disturbance at any time and the flue be used as an ordinary one, to which purpose it is adapted.

For my purpose the Glover tower is best closed at the bottom. The acid which collects in the bottom of the tower to the depth of several inches instead of being drawn off, as usual, overflows by a projecting lip into the concentrating-flue and spreads over its bottom in a thin sheet. It flows in this way against the current of hot gases, which act directly upon its suface until the stream reaches a slot cut in the bottom of the flue and drops into a vessel, from which it can be drawn off and cooled.

The concentrating effect is a question of surface exposed to the hot gases and the time of exposure, other things being equal. The thinner the stream is in depth and the longer its run the greater the effect. Whether the concentration can be carried to the highest point will depend upon the temperature which can be maintained in the flue where the final concentration takes place.

In the normal case where good brimstone is burned, the composition of the burner-gases being by volume about eleven per cent. sulfur dioxid, ten per cent. oxygen, and seventy-nine per cent. nitrogen, the theoretical temperature of the gases will be about 1,100° centigrade. It will be even higher than this with good pyrites, notwithstanding the fact that the gases are more dilute. Owing to various sources of loss—such as excess of air, incomplete combustion, and especially radiation and conduction—the temperature falls much below this; but when care is taken to reduce the loss by radiation in the burners and flues a temperature of 350° or 400° centigrade can be maintained, and this is sufficient for the work, since the boiling-point of the highest concentrated acid is a little above 300° centigrade. It thus appears that I propose to finish the concentration of the acid in the same apparatus in which it is made—viz., in the burner-tower and chamber system and their ordinary connections suitably modified—without the use of extraneous heat.

In the system proposed by me all the vapor of water and acid driven off is utilized, the heat of vaporization and the heat of dissociation remain in the system, and the water converted into steam passes finally into the chambers to serve its special office. The flue being practically unobstructed and the temperature high no weak acid will be condensed in it. The only acid that can condense is that proper to the temperature, and vapor tension, or, what amounts to the same thing, the vapors, can only form liquid acids having higher boiling-points than the temperature of the flue. The hot flue will exercise a sorting action upon the vapor and condense only strong acid. The weaker vapor will pass onto the tower.

The office of the apparatus will be that of a combined still and condenser with a selective reflux action.

The tower is expected to perform its usual function—that is, to turn out a denitrated acid of the ordinary tower strength. It is true that a large quantity of water-vapor will pass into it; but this is just what is needed to increase its activity. In the ordinary tower, which gets its supply of water from the top only, the upper portion is acid-making. The burner-gases are sulfur dioxid and air, with an excess of nitrogen. To make sulfuric acid, we need in addition water-vapor and nitrous oxid. It is only after the burner-gases have passed well up into the tower that these extra elements are met with in such abundance as to cause a vigorous acid-making action. In my arrangement water-vapor is mixed with the burner-gases in the flue and by supplying the nitrous element liberally the gases when they arrive at the grill of the tower, or very soon afterward, will be well mixed and ready for work. The vigorous formation of sulfuric acid will increase the heat and concentrating action of the tower. The result will be a large yield of tower-acid and a greater supply of steam for the chambers as compared with the ordinary arrangement. The conditions are also more favorable for the office of denitration. There is a greater heat and a larger percentage of $H_2O$ in the form of steam, while the $SO_2$ will still remain in excess.

Figure 1 of the accompanying drawings represents a vertical section of an apparatus embodying my improvements and adapted for carrying out my process. Fig. 2 represents a plan view thereof. Fig. 3 represents a longitudinal vertical section on line 3 3 of Fig. 4 of my improved intermediate flue disposed between the burner-kiln and the Glover tower, showing a section of the lower part of said tower and the connection of said intermediate flue therewith, and means for regulating the height of liquid which flows from the tower into the flue. Fig. 4 represents a horizontal section of said intermediate flue on line 4 4 of Fig. 3. Fig. 5 represents a section of the lower part of the Glover tower provided with a device for regulating the height of the liquid in the tower, and thereby controlling its outflow. Fig. 6 represents an end view of the ledge over which the liquid flows from the bottom of the tower to the concentrating-flue, said ledge when constructed in the form shown being provided with grooves for the passage of the liquid.

The same reference-numerals indicate the same parts in all the figures.

The burner-kiln 10, in which the brimstone or pyrites is burned to produce the sulfur fumes used in the making of the sulfuric acid, may be of any suitable form, and, as herein shown, it is provided with a mixing-chamber 15, the walls of said kiln and chamber being composed of non-conducting material and so constructed as to conserve the heat, avoiding loss by radiation and conduction. In the apparatus shown means are provided for regulating the temperature, these means consisting of a metallic plate 16 at the top of the mixing-chamber 15 and a layer 17 of infusorial earth or other suitable removable non-conducting material disposed over said plate. If the temperature of the fumes gets too high, more or less of the earth covering 17 is shoveled off, and sufficient heat escapes by radiation and conduction through the plate 16 to reduce the temperature to a proper degree.

A flue 20 is connected at one end with the burner-kiln and at the other end with a reaction-chamber either in the form of a Glover tower or one of the "lead" chambers. In the form shown the flue is inclined and connected at its lower end with the mixing-chamber 15 of the burner-kiln and at its upper end with the Glover tower 30. This flue serves the double purpose of conveying the sulfur fumes of the burner-kiln to the reaction-chambers and to evaporate the surplus water contained in the weak acid produced in the chambers and tower, and thereby concentrate such acid to the proper strength, the flue being composed of non-conductive material to conserve the heat of the passing hot gases and so constructed as to best expose the acid to the action of said gases. For the latter purpose the bottom of the flue is preferably step-shaped, forming a series of concentrating-surfaces disposed in succession one below another, over which the acid flows from the rear toward the front end of the flue. For convenience the flue is preferably constructed in sections, all of which are alike except the end sections. The front end section is made to fit an opening in the kiln, and the rear end section is shaped to fit the tower or chamber, as the case may be. The most suitable material known to me of which to construct the concentrating-flue is volvic lava from the south of France. This stands well the action of both heat and strong acid. It may be procured in large slabs and is readily cut by stone-cutters to the proper shape. I do not limit myself, however, to this material. It may be proved hereafter that a better natural material exists or may be made artificially. Each section is composed of four slabs—a bottom slab, two side slabs, and a top slab. The bottom slabs are shallow wide troughs, and each is provided at its rear end with a transverse flange 21 on its upper side, at its front end with a transverse flange 22 on its under side, and with longitudinal side flanges or lips 23 on its upper side. On this construction the acid is made to flow in a thin continuous sheet or film over the several steps formed by the flue, and is thus thoroughly exposed to the concentrating action of the gases, which flow in the opposite direction in an unobstructed current, so that no recondensation takes place in the flue. In the bottom of the last section a slot 25 is cut through the bottom slab in the path of the flowing acid, through which it drops into a receiving vessel 100, disposed underneath.

The conditions to be fulfilled in the construction of the flue are that it shall retain the acid, be thick enough to prevent too rapid a loss of heat, and should be of such capacity as to give ample time for the action of the hot gases upon the stream of acid.

The width of the flue is limited by the size of the slabs which can be cut and handled without too great a risk of breakage. Five or even four feet in the clear will generally answer. The minimum height of the flue at the points where the sections join should not be less than two feet. Where large quantities of acid are handled, this should be increased to three feet. There is a considerable amount of vapor given off, tending to crowd the flue, and ample space should be given it.

As tight a joint as possible should be made between the projecting flange 22 and the lava bottom under it. To make a tight joint with the tower, the lead casing thereof is brought out around the flue and a tight joint is made in the usual way by a collar 28, of iron, and an acid-proof packing beyond it.

In order to regulate the degree of concentration, it is well to have an excess of heat at command and some simple means of lessening it. For this purpose a portion of the flue preceding the concentrating-flue may be covered with iron plates having a layer of ashes or infusorial earth, as heretofore explained.

The Glover tower 40 may be constructed in any suitable manner and lined with volvic lava. In the form shown it is divided, as usual, by a grill or grating 41, disposed some distance above its bottom, into a chamber 42 above the grating, in which chemical reactions take place, and a collecting-chamber 43 below it, the reaction-chamber having a filling 44 of quartz or other suitable material. The tower is provided with an opening on one side near its bottom, through which the upper end of the concentrating-flue 20 communicates with the tower, and a pipe 50 near the top of the tower connects it with the first lead chamber 70. As usual, an acid-showering device 45 is disposed at the top of the tower. A ledge 46 is disposed at the mouth of the opening into the concentrating-flue, over which the acid collected at the bottom of the tower passes into said flue.

Automatic means are provided for regulating the flow of acid and securing a uniform stream in the concentrating-flue 20. The means shown consist of a swing draw-off pipe comprising a fixed pipe 60, extending through the wall of the tower at the bottom thereof, and an elbow-pipe 61, swiveled on the outer end of the pipe 60. By turning the elbow-pipe the bend thereof is elevated or lowered, and the level of the liquid in the bottom of the tower will be adjusted to correspond with the height of the elbow. This adjustment may be effected by a chain 62, connected at one end to the elbow-pipe and wound at the other end on a spool 63, supported on a spindle 64, attached to the wall of the tower. This draw-off pipe may deliver into the boot of the chambers. To make the adjustment more delicate, the stream of acid may be caused to flow through one or more narrow notches 47 in the projecting ledge before it is distributed into the flue 20. By this means the stream of acid may be reduced until the desired degree of concentration is attained or even entirely diverted from the flue, if this should become necessary. If the flue is used without a Glover tower, it may be connected directly with the first chamber. The chamber-acid is made to flow continuously into it, and the vapor of concentration passes direct into the chamber to serve the office of steam. The Glover tower 40 is connected with the lead chambers and Gay-Lussac tower 90 in any usual way, and the operation is conducted in the usual manner except as regards the operation in the flue 20.

I claim as my invention—

1. In an apparatus for obtaining sulfuric acid, the combination of a kiln for burning sulfur, a reaction device and a flue extending from said kiln to said reaction device, said flue having a series of steps over which the acid flows from the reaction device in continuous contact with the gases passing from the furnace to said device.

2. In an apparatus for obtaining sulfuric acid, the combination of a kiln for burning sulfur, a reaction device having an opening at one side near its bottom, a flue extending from said kiln to said reaction device and communicating therewith through said opening, said flue having a series of steps over which the acid flows in continuous contact with the gases passing from the furnace to the reaction device, and a ledge at said opening over which the acid flows from the reaction device into said flue.

3. In an apparatus for making concentrated sulfuric acid, the combination of a sulfur-kiln, a reaction device having an opening at one side near its bottom, a flue extending from said kiln to said reaction device and communicating therewith through said opening, a ledge at said opening over which the acid flows from the reaction device into said flue, said flue serving to expose the acid to the heating and concentrating action of the sulfur-fumes, and means for regulating the depth of the liquid at the bottom of the reaction device so as to secure a uniform flow of liquid through the flue.

4. In an apparatus for making concentrated sulfuric acid, the combination of a burner-kiln, a reaction device, and a flue between said kiln and reaction device comprising separable sections of non-conducting material, the bottom of said flue being in the form of a series of steps over which the acid from the reaction device is adapted to flow for exposure to the sulfur-fumes whereby concentration is effected.

5. In an apparatus for making concentrated sulfuric acid, the combination of a burner-kiln, a reaction device, and a flue between said kiln and reaction device, the bottom of said flue being in the form of a series of steps over which the acid from the reaction device is adapted to flow, each of said steps being in the form of a slab provided with upwardly-extending flanges at the back and sides thereof, and a downwardly-extending lip at the front edge thereof for delivering the stream of acid to the next step.

6. In an apparatus for making concentrated sulfuric acid, the combination of a burner-kiln, a reaction device, a flue between said kiln and reaction device, the bottom of said flue being in the form of a series of steps each of which is composed of a slab provided with upwardly-extending flanges at the back and sides thereof, and a downwardly-extending lip at the front edge thereof, said lip overlapping the upwardly-extending flange at the back of the next adjacent step.

7. In an apparatus for making concentrated sulfuric acid, the combination of a sulfur-kiln, a reaction device, a concentrating-flue disposed between the sulfur-kiln and reaction device and adapted to convey the sulfur-fumes from the kiln to the reaction device and to expose the acid from said reaction device to the heat of said fumes, said flue being provided with a slot near said kiln, and a receptacle connected with said slot for receiving the acid delivered therethrough.

8. In an apparatus for making concentrated sulfuric acid, the combination of a sulfur-kiln, a reaction device, and a concentrating-flue disposed between the sulfur-kiln and reaction device and adapted to convey the sulfur-fumes from the kiln to the reaction device, said flue being composed of non-conducting material and having a step-shaped bottom for exposing the acid in a continuous sheet to the concentrating action of said fumes.

WILLIAM RUSSELL QUINAN.

Witnesses:
ALFRED NUTTING,
JAMES O'DONNELL.